(12) United States Patent
Faxer et al.

(10) Patent No.: US 11,902,023 B2
(45) Date of Patent: Feb. 13, 2024

(54) METHODS FOR RETRANSMISSION IN THE PRESENCE OF DYNAMIC RATE MATCHING INDICATIONS

(71) Applicant: Telefonaktiebolaget LM Ericsson (publ), Stockholm (SE)

(72) Inventors: Sebastian Faxer, Jarfalla (SE); Mattias Andersson, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 569 days.

(21) Appl. No.: 17/253,033

(22) PCT Filed: Jun. 26, 2018

(86) PCT No.: PCT/SE2018/050688
§ 371 (c)(1),
(2) Date: Dec. 16, 2020

(87) PCT Pub. No.: WO2020/005125
PCT Pub. Date: Jan. 2, 2020

(65) Prior Publication Data
US 2021/0320755 A1    Oct. 14, 2021

(51) Int. Cl.
*H04W 72/23* (2023.01)
*H04L 1/08* (2006.01)
*H04W 24/08* (2009.01)

(52) U.S. Cl.
CPC .............. *H04L 1/08* (2013.01); *H04W 24/08* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 9,237,561 B2* | 1/2016 | Han | H04L 1/1819 |
| 2014/0092789 A1* | 4/2014 | Lei | H04J 3/1694 |
| | | | 370/280 |
| 2017/0187494 A1* | 6/2017 | Tirronen | H04L 1/1896 |
| 2018/0092073 A1* | 3/2018 | Nogami | H04W 52/16 |
| 2018/0123744 A1* | 5/2018 | Nogami | H04W 52/248 |

(Continued)

FOREIGN PATENT DOCUMENTS

| | | |
|---|---|---|
| EP | 3297367 A1 | 3/2018 |
| WO | 2009088190 A1 | 7/2009 |

(Continued)

OTHER PUBLICATIONS

EPO Communication and Search Report dated Dec. 14, 2021 for Patent Application No. 18924578.0, consisting of 8-pages.

(Continued)

*Primary Examiner* — Anh Vu H Ly
(74) *Attorney, Agent, or Firm* — Christopher & Weisberg, P.A.

(57) ABSTRACT

The invention relates to a method performed by a network node, in which the method includes retransmitting data to a user equipment using a New data indicator, NDI, based on monitoring a Physical Uplink Shared Channel, PUSCH. The invention further relates to a method for a user equipment, a network node and a user equipment.

10 Claims, 9 Drawing Sheets

400

410 retransmitting data, to a user equipment using a New data indicator, NDI, based on monitoring a Physical Uplink Shared Channel, PUSCH.

420 determining that the user equipment missed a Channel state information request, based on the monitoring of the PUSCH

(56) References Cited

U.S. PATENT DOCUMENTS

2021/0135791 A1* 5/2021 Wang .................... H04W 72/20
2021/0152319 A1* 5/2021 Tang .................... H04L 5/0055

FOREIGN PATENT DOCUMENTS

WO         2018030756 A1      2/2018
WO    WO-2018210407 A1 * 11/2018   .......... H04L 1/1835

OTHER PUBLICATIONS

3GPP TSG RAN WG1 Meeting #89 R1-1706962; Title: Scheduling mechanisms for CBG-based re-transmission; Agenda Item: 7.1.3.3.5; Source: Huawei, HiSilicon; Document for: Discussion and decision; Date and Location: May 15-19, 2017, Hangzhou, China, consisting of 3-pages.

3GPP TSG RAN WG1 Meeting #92bis R1-1804804; Title: Remaining issues for multiplexing UCI on PUSCH; Agenda tem: 7.1.3.2.3; Source: Qualcomm Incorporated; Document for: Discussion/Decision; Date and Location: Apr. 16-20, 2018 Sanya, China, consisting of 8-pages.

3GPP TSG RAN WG1 Meeting #90 R1-1715223; Title: Offline discussions on CBG-based retransmissions for AI 6.1.3.3.4; Agenda Item: 6.1.3.3.4; Source: Samsung; Document for: Discussion and Decision; Date and Location: Aug. 21-25, 2017, Prague, Czechia, consisting of 8-pages.

International Search Report and Written Opinion dated Apr. 16, 2019 for International Application No. PCT/SE2018/050688 filed on Jun. 26, 2018, consisting of 11-pages.

3GPP TSG RAN WG1 NR Ad-Hoc#2 R1-1710726; Title: Scheduling for CBG-based Retransmissions; Agenda Item: 6.1.3.3.4.2; Source: Samsung; Document for: Discussion and Decision; Date and Location: Jun. 27-30, 2017, Qingdao, P.R. China, consisting of 8-pages.

3GPP TSG RAN WG1 Meeting #83 R1-156503; Title: On CSI measurements and feedback; Agenda Item: 6.2.1.8; Source: Intel Corporation; Document for: Discussion/Decision; Date and Location: Nov. 16-20, 2015, consisting of 3-pages.

3GPP TS 38.214 V15.1.0; 3rd Generation Partnership Project; Technical Specification Group Radio Access Network; NR; Physical layer procedures for data (Release 15); Mar. 2018, France, consisting of 77-pages.

* cited by examiner

METHODS FOR RETRANSMISSION IN THE PRESENCE OF DYNAMIC RATE MATCHING INDICATIONS

CROSS-REFERENCE TO RELATED APPLICATIONS

This application is a Submission Under 35 U.S.C. § 371 for U.S. National Stage Patent Application of International Application Number: PCT/SE2018/050688, filed Jun. 26, 2018 entitled "METHODS FOR RETRANSMISSION IN THE PRESENCE OF DYNAMIC RATE MATCHING INDICATIONS," the entirety of which is incorporated herein by reference.

TECHNICAL FIELD

The invention relates to a method for retransmitting data. The invention further relates to a method for a user equipment, a network node and a user equipment.

BACKGROUND

The next generation mobile wireless communication system (5G) or new radio (NR) supports "slot based" transmission. In each slot, a network node, such as a gNB, transmits downlink control information (DCI) about which User Equipment (UE) data is to be transmitted to and what resources in the current downlink slot the data will be transmitted on. The DCI is carried on the Physical Control Channel (PDCCH) and the corresponding data is carried on Physical Downlink Shared Channel (PDSCH).

The PDCCH is typically transmitted in control resource sets (CORESETs) in the first few OFDM symbols in each slot. A UE first decodes PDCCH and if a PDCCH is decoded successfully, it then decodes the corresponding PDSCH based on the decoded DCI in the PDCCH.

In addition, NR supports aperiodic Channel state information (A-CSI) feedback with reporting on the Physical Uplink Shared Channel (PUSCH): This type of CSI reporting may involve a single-shot (i.e., one time) CSI report by a UE which is dynamically triggered by the gNB using DCI, e.g. triggered by sending a Channel state information (CSI) request comprised in the DCI. Some of the parameters related to the configuration of the aperiodic CSI report are semi-statically configured by RRC but the triggering is dynamic, typically by sending a Channel state information (CSI) request. Channel state information (CSI) feedback is used by a network node, such as a gNB, to obtain DL CSI from a UE. This is e.g. used in order to determine how to transmit DL data to a UE over plurality of antenna ports.

Non-zero power (NZP) CSI Reference Symbols (CSI-RS) are typically transmitted by the network node and used for measuring downlink CSI by the UE. A time-frequency resource used for transmitting CSI-RS is referred to as a CSI-RS resource. The PDSCH is not mapped to resource elements containing CSI-RS resources, which colloquially is referred to as "PDSCH rate matches around CSI-RS".

The presence of aperiodic CSI-RS is indicated with a downlink transmission of (uplink UL) DCI, effectively scheduling a PUSCH transmission. If the UE misses the UL DCI transmission, it will be unaware of the presence of aperiodic CSI-RS in the downlink transmission, and assume that all symbols are allocated for PDSCH. If the UE receives a PDSCH in the same slot as where aperiodic CSI-RS is triggered, the UE will not be aware of the correct resource mapping of the PDSCH and the PDSCH will be incorrectly decoded.

Thus, there is a need for an improved method performed by a network node.

OBJECTS OF THE INVENTION

An objective of embodiments of the present invention is to provide a solution which mitigates or solves the drawbacks described above.

SUMMARY OF THE INVENTION

The above and further objectives are achieved by the subject matter described herein. Further advantageous implementation forms of the invention are described herein.

According to an aspect of the invention, the above mentioned objectives are achieved by a method performed by a network node, the method comprising retransmitting data, to a user equipment (UE) using a New data indicator, NDI, based on monitoring a Physical Uplink Shared Channel, PUSCH. In one embodiment, the method further comprises the step of determining that the user equipment (UE) missed a Channel state information (CSI) request, based on the monitoring of the PUSCH. In one embodiment, using a New data indicator, NDI comprises transmitting downlink control information, DCI, associated to the retransmitted data, and toggling an NDI bit of the associated DCI to indicate that one or more soft buffers of the UE should be flushed. In one embodiment, the DCI associated to the retransmitted data further indicates that Code Block Group, CBG, based transmission is used and that a CBGFI indicator is set to indicate that soft buffers of the UE, corresponding to all CBGs, should be flushed. In one embodiment, the DCI associated to the retransmitted data further indicates that Code Block Group, CBG, based transmission is used and that a CBGFI indicator is set to indicate that soft buffers of the UE, corresponding to a selection of CBGs, should be flushed. In one embodiment, the method further comprises signaling an indication of a total number of coded bits of the data or signaling an indication of a number of resource elements, REs, in an initial data transmission, that where not allocated for PDSCH transmission.

At least one advantage of this aspect of the disclosure is that fewer retransmissions are required for the case when the UE missed the aperiodic CSI-RS indication. I.e. transmission efficiency and resource utilization is improved.

According to yet an aspect of the invention, the above mentioned objectives are achieved by a method performed by a user equipment, the method comprising receiving retransmitted data and associated DCI, and if an NDI bit of the retransmitted DCI is toggled in relation to DCI associated to an initial data transmission, flushing out one or more soft buffers comprising received soft bits from the initial data transmission. In one embodiment, the DCI associated to the retransmitted data further indicates that Code Block Group, CBG, based transmission is used and that a CBGFI indicator is set to indicate that soft buffers corresponding to all CBGs should be flushed. in one embodiment, the retransmitted DCI further indicates that Code Block Group, CBG, based transmission is used and that a CBGFI indicator is set to indicate that a soft buffer corresponding to a selection of CBGs should be flushed. In one embodiment, the method further comprises receiving an indication of a total number of coded bits of the retransmitted data, or, receiving an indication of a number of resource elements, REs, in an initial data transmission, that where not allocated for PDSCH transmission.

According to yet an aspect of the invention, the above mentioned objectives are achieved by a network node.

According to yet an aspect of the invention, the above mentioned objectives are achieved by a user equipment.

According to yet an aspect of the invention, the above mentioned objectives are achieved by a computer program comprising computer-executable instructions for causing a network node, when the computer-executable instructions are executed on a processing unit comprised in the network node to perform any of the method steps described herein.

According to yet an aspect of the invention, the above mentioned objectives are achieved by a computer program comprising computer-executable instructions for causing a user equipment when the computer-executable instructions are executed on a processing unit comprised in the user equipment, to perform any of the method steps described herein.

According to yet an aspect of the invention, the above mentioned objectives are achieved by a computer program product comprising a computer-readable storage medium, the computer-readable storage medium having the computer program above embodied therein.

According to yet an aspect of the invention, the above mentioned objectives are achieved by a carrier containing any of the computer programs above, wherein the carrier is one of an electronic signal, optical signal, radio signal, or computer readable storage medium.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly

Figure 1:
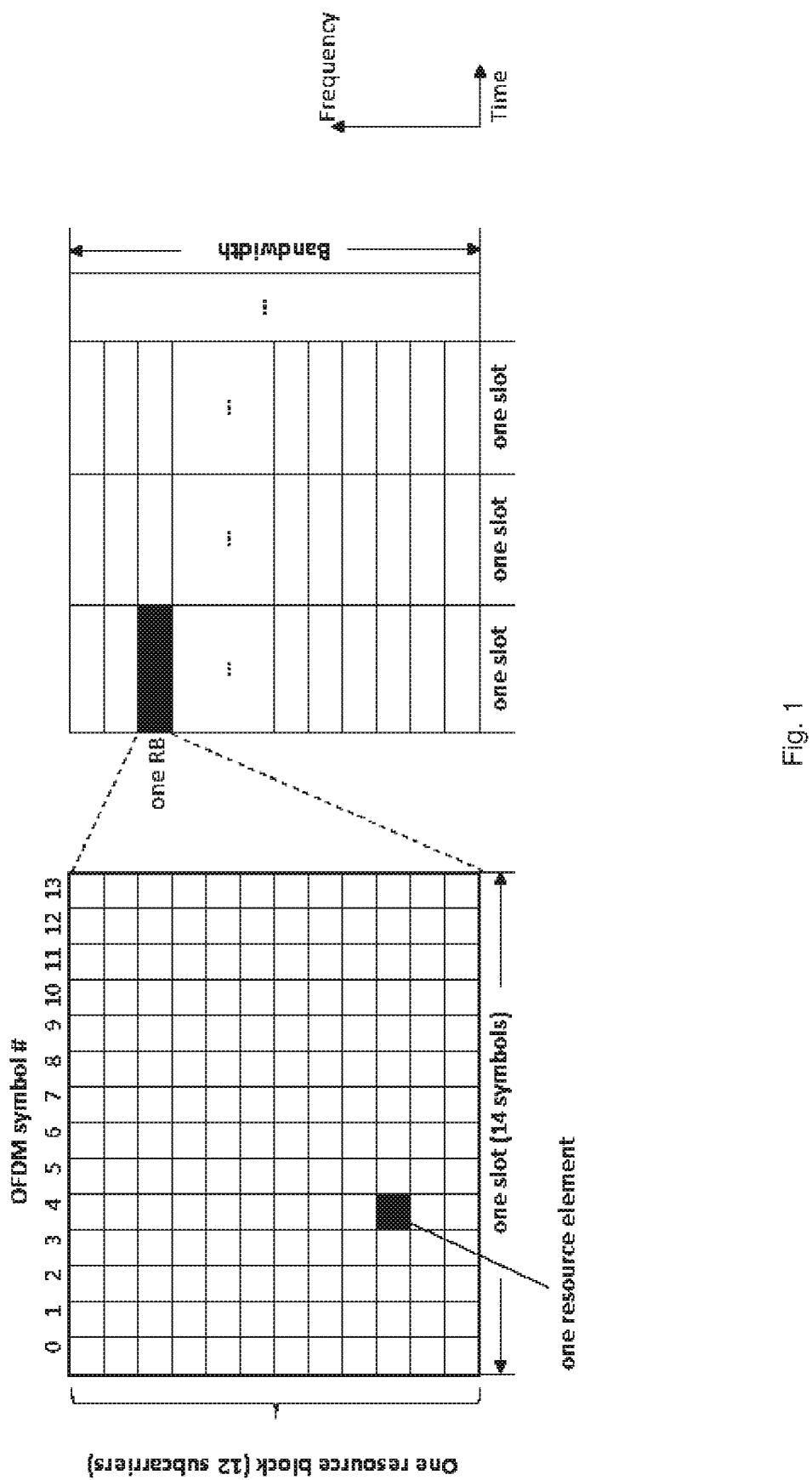
FIG. 1 illustrates a time-frequency grid in accordance with some embodiments.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The present disclosure is disclosed in the context of next generation mobile wireless communication system (5G) or new radio (NR), but it is understood that the teaching herein is not limited thereto.

Examples of data, in this disclosure may e.g. refer to user data. User data are generally information bits for transmission using a user data channel, such as e.g. the PDSCH in 3GPP LTE or NR. Information bits may be encoded before transmission and modulated as described herein. A transport block is an example of data.

The next generation mobile wireless communication system (5G) or new radio (NR), will support a diverse set of use cases, and a diverse set of deployment scenarios. The later includes deployment at both low frequencies (100s of MHz), similar to 3rd Generation Partnership Project Long Term Evolution, LTE, today, and very high frequencies (mm waves in the tens of GHz).

Similar to LTE, NR will use OFDM in the downlink, i.e. from a network node such as a gNB, eNB, or base station, to a user equipment or user equipment UE. In the uplink, UL, i.e. in the direction from UE to network node, both DFT-spread OFDM and OFDM will be supported.

The basic NR physical resource can thus be seen as a time-frequency grid as illustrated in FIG. 1, where each resource element, RE, corresponds to one OFDM subcarrier during one OFDM symbol interval. Resource allocation in a slot is described in terms of frequency resources, i.e. resource blocks (RBs) in the frequency domain, and number of time resources, i.e. OFDM symbols in the time domain. A RB may e.g. correspond to 12 contiguous subcarriers and a slot consists of 14 OFDM symbols.

Different subcarrier spacing values are supported in NR. The supported subcarrier spacing values (also referred to as numerologies) in NR are given by $\Delta f=(15 \times 2^{\alpha})$ kHz where $\alpha$ is a non-negative integer.

Figure 2:
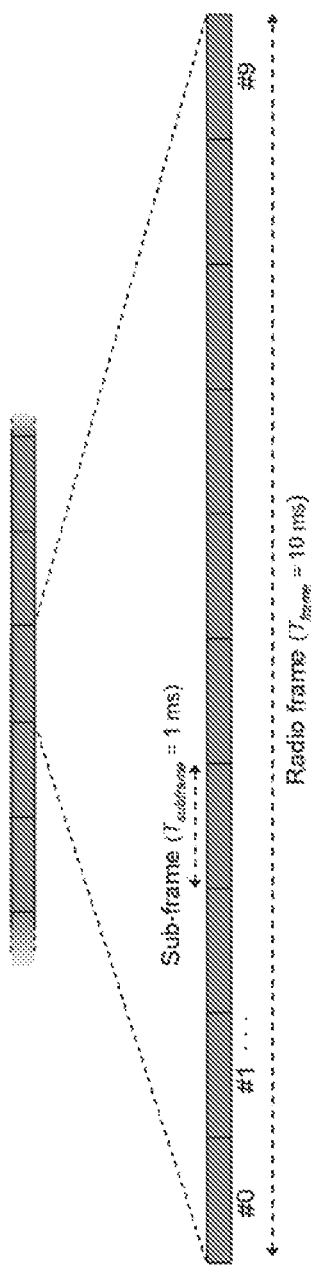
FIG. 2 illustrates sub frames in accordance with some embodiments.

In the time domain, downlink and uplink transmissions in NR are organized into equally-sized subframes similar to LTE as shown in FIG. 2. A subframe is further divided into slots and the number of slot per subframe is $2^{\alpha+1}$ for a numerology of $(15 \times 2^{\alpha})$ kHz.

NR supports "slot based" transmission. In each slot, the gNB transmits downlink control information (DCI), e.g. about which UE data is to be transmitted to and which resources in the current downlink slot the data is or will be transmitted on. The DCI is carried on the Physical Control Channel (PDCCH) and data is carried on Physical Downlink Shared Channel (PDSCH). This PDCCH is typically transmitted in control resource sets (CORESETs) in the first few OFDM symbols in each slot. A UE first decodes PDCCH and if a PDCCH is decoded successfully, it then decodes the corresponding PDSCH, e.g. carrying data, based on the decoded DCI in the PDCCH.

Uplink data transmissions are also dynamically scheduled using PDCCH. Similar to downlink transmissions, a UE first decodes a uplink grant in a UL DCI carried by PDCCH and then transmits data over the Physical Uplink Shared Channel (PUSCH), based the decoded control information in the UD DCI/uplink grant, such as modulation order, coding rate, uplink resource allocation, and etc.

Each UE is assigned with a unique C-RNTI (Cell Radio Network Temporary Identifier) during network connection. The CRC (cyclic redundancy check) bits attached to a DCI for a UE is scrambled by the UE's C-RNTI, so a UE recognizes its own DCI by checking the CRC bits of the DCI against the assigned C-RNTI.

Figure 3:
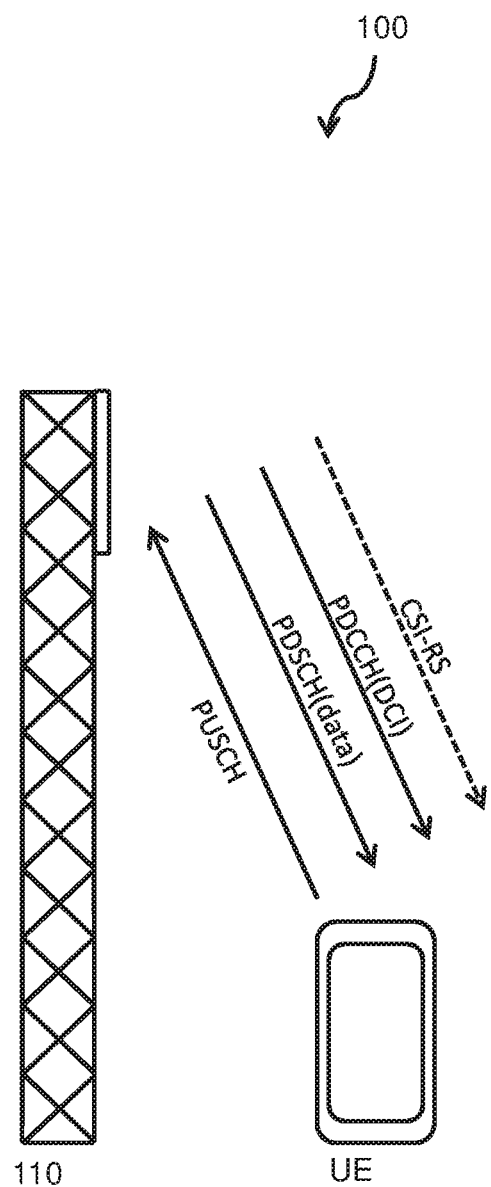
FIG. 3 illustrates a network node communicating with a user equipment according to one or more embodiments of the present disclosure.

FIG. 3 illustrates a network node 110 communicating with a user equipment UE according to one or more embodiments of the present disclosure. The network node 110 transmits DCI to the UE carried on the Physical Control Channel (PDCCH). The network node 110 transmits data to the UE carried on the Physical Downlink Shared Channel (PDSCH). The network node 110 may further transmit CSI-RS to the UE. The transmission of DCI and data may be performed on a set of resources, e.g. a slot. The slot may comprise a control set of resources, a primary set of resources and a secondary set of resources, i.e. three separate sets, of mutually exclusive resources. The different sets of resources are further described in relation to FIGS. 7 and 8.

In one example, downlink PDSCH data and associated DCI is transmitted by the network node. A downlink transmission of a first message or transport block is scheduled and the gNB generates downlink control information (DCI) about which associated UE/DL data is to be transmitted and which resources, e.g. in a downlink slot, the data will be transmitted on. The gNB then transmits the first message, to the UE, using a first set of resources, comprising time resources and frequency resources, e.g. a slot. The first message comprising the generated DCI indicating at least a part of the first set of resources for UE reception of UE/DL data on the PDCCH. The first set of resources may comprise a control set, a primary set and a secondary set, i.e. three separate sets, of mutually exclusive resources. The first message may comprise DCI in the control set of resources and/or UE/DL data in the primary and/or the secondary set of resources. In this example, the UE correctly interprets the resources in the primary and secondary set as UE/DL data on the PDCCH.

In other words, transmitting, to the UE, using the first set of resources, e.g. at least a first time resource and a first frequency resource, a first message indicating a set of resources for UE reception of data, the set of resources comprising a primary and a secondary set of resources. The DCI may be arranged according to DL DCI format 1_0 or 1_1 in NR, which indicates, in addition to other things, allocated frequency-domain PRBs and time-domain OFDM symbols. The control set may be comprising symbols and subcarriers used for DL DCI on PDCCH. The first message may comprise DL DCI using format 1_0 or 1_1 in NR. The first set of resources may at least comprise the frequency-domain PRBs and the time-domain OFDM symbols of the PDCCH and/or the PDSCH. Data can be seen as the information symbols of the PDSCH. DCI can be seen as information symbols of the PDCCH.

In one example, a data/PDSCH transmission is scheduled by a DL DCI (Format 1_0 or 1_1 in NR), which indicates, in addition to other things, the frequency-domain PRBs and the time-domain OFDM symbols whereon the PDSCH is to be carried.

The DCI may be arranged according to DL DCI format 1_0 or 1_1 in NR, which indicates, in addition to other things, allocated frequency-domain PRBs and time-domain OFDM symbols. The control set may be comprising symbols and subcarriers used e.g. for DL DCI on PDCCH. The first message may comprise DL DCI using format 1_0 or 1_1 in NR.

In one further example, downlink PDSCH data and associated DCI as well as DCI scheduling an uplink transmission is transmitted by the network node. An uplink transmission of a second message and/or transport block is scheduled and the gNB transmits DCI comprising uplink, UL, control information, e.g. an uplink grant, about which information the UE is expected to transmit and which resources in an uplink slot the information will be transmitted on. The UE transmits the expected information, e.g. an UL data, to the network node 110 carried on the Physical Uplink Shared Channel (PUSCH). The DCI or uplink grant may comprise modulation order, coding rate, uplink resource allocation etc.

In one further example, only DCI scheduling an uplink transmission is transmitted by the network node. A downlink transmission of a third message or transport block is scheduled and the gNB generates downlink control information (DCI) about which associated third UE/DL data is to be transmitted and which resources, e.g. in a downlink slot, the data will be transmitted on. The gNB then transmitting the third message, to the UE, using a third set of resources, comprising time resources and frequency resources. The third message comprising the generated DCI, e.g. indicating at least a set of uplink resources for UE transmission of information on the PUSCH.

If the gNB determines, for one reason or another, that CSI is required. The gNB schedules an uplink transmission of a fourth message, e.g. an aperiodic CSI report, and a downlink transmission of a fifth message or transport block, including DCI indicative of an aperiodic Channel state information (CSI) request, i.e. configuring the CSI measurement. The gNB then generates fifth downlink control information (DCI) indicating what UL/network node information is to be transmitted, indicates the CSI request and indicates on which resources the UL/network node information (CSI report) will be transmitted on in the fourth message. The fifth downlink control information (DCI) may further indicate which associated UE/DL data is to be transmitted and which resources, e.g. in a downlink slot, the data will be transmitted on. The gNB then transmits the fifth message, to the UE, using a fifth set of resources, comprising time resources and frequency resources. The fifth message comprising the generated fifth DCI. The fifth set of resources may comprise a control set of resources further comprising the fifth DCI. The fifth set of resources may further comprise primary and secondary set of resources comprising UE/DL data.

Depending on the success of the transmittal of said fifth message, the UE will behave differently.

In a scenario where the UE receives and decodes the fifth message correctly, the UE will perform channel measurements, e.g. on a subsequent sixth DL message transmitted using a sixth set of resources. The sixth set of resources may comprise a control set, a primary set and a secondary set, i.e.

three separate sets, of mutually exclusive resources. The measurements may e.g. be performed using the one or more CSI-RS comprised in the secondary set of resources. The UE may further receive sixth DCI comprised in the control set of resources, which are selected from the sixth set of resources. The UE may further receive sixth data comprised in the primary set of resources selected from the sixth set of resources. The UE will then transmit an aperiodic CSI report on the PUSCH, in the fourth message, which is generated using CSI-RS comprised in the secondary set of resources of the sixth transmission.

In a scenario where the UE fails to receive and decode the fifth message correctly, the UE will attempt to receive the sixth data and assume that the DL/UE data is comprised in the primary set and in the secondary set of resources. In other words, the UE will not be aware of the fact that the UE is expected to perform CSI measurements and that some of the resources in the sixth message are used for CSI-RS. Thus, no aperiodic CSI report on the PUSCH will be sent by the UE. The gNB may thus determine that the UE missed the fifth message, comprising a CSI request, based on the monitoring of the PUSCH.

As indicated by the background section, the present disclosure comprises a method for performing a retransmission of a transport block, where the initial transmission of the transport block occurred in the same slot where an aperiodic NZP CSI-RS was triggered. The aperiodic NZP CSI-RS may be triggered by a gNB transmitting an UL DCI. The same UL DCI may also schedule a PUSCH transmission for the UE (which carries the CSI report associated with the aperiodic CSI-RS). Thus, the gNB may determine if the UE received an indication of the presence of the aperiodic CSI-RS indirectly by determining if the UE transmitted a CSI report using the scheduled PUSCH transmission.

In one embodiment, the network node 110 includes a selection of any of processing circuitry, device readable medium, interface, auxiliary equipment, power source, power circuitry, and antenna. Although the network node 110 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, a network node may comprise multiple different physical components that make up a single illustrated component (e.g., device readable medium may comprise multiple separate hard drives as well as multiple RAM modules).

Similarly, network node 110 may be composed of multiple physically separate components (e.g., a NodeB component and a RNC component, or a BTS component and a BSC component, etc.), which may each have their own respective components. In certain scenarios in which network node 110 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 110 may be configured to support multiple radio access technologies (RATs). In such embodiments, some components may be duplicated (e.g., separate device readable medium for the different RATs) and some components may be reused (e.g., the same antenna may be shared by the RATs). Network node 110 may also include multiple sets of the various illustrated components for different wireless technologies integrated into network node 110, such as, for example, GSM, WCDMA, LTE, NR, WiFi, or Bluetooth wireless technologies. These wireless technologies may be integrated into the same or different chip or set of chips and other components within network node 110.

Processing circuitry is configured to perform any determining, calculating, or similar operations (e.g., certain obtaining operations) described herein as being provided by a network node. These operations performed by processing circuitry may include processing information obtained by processing circuitry by, for example, converting the obtained information into other information, comparing the obtained information or converted information to information stored in the network node, and/or performing one or more operations based on the obtained information or converted information, and as a result of said processing making a determination.

Processing circuitry may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 110 components, such as device readable medium, network node 110 functionality. For example, processing circuitry may execute instructions stored in device readable medium or in memory within processing circuitry. Such functionality may include providing any of the various wireless features, functions, or benefits discussed herein. In some embodiments, processing circuitry may include a system on a chip (SOC).

In some embodiments, processing circuitry may include one or more of radio frequency (RF) transceiver circuitry and baseband processing circuitry. In some embodiments, radio frequency (RF) transceiver circuitry and baseband processing circuitry may be on separate chips (or sets of chips), boards, or units, such as radio units and digital units. In alternative embodiments, part or all of RF transceiver circuitry and baseband processing circuitry may be on the same chip or set of chips, boards, or units In certain embodiments, some or all of the functionality described herein as being provided by a network node, base station, eNB or other such network device may be performed by processing circuitry executing instructions stored on device readable medium or memory within processing circuitry. In alternative embodiments, some or all of the functionality may be provided by processing circuitry without executing instructions stored on a separate or discrete device readable medium, such as in a hard-wired manner. In any of those embodiments, whether executing instructions stored on a device readable storage medium or not, processing circuitry can be configured to perform the described functionality. The benefits provided by such functionality are not limited to processing circuitry alone or to other components of network node, but are enjoyed by network node 110 as a whole, and/or by end users and the wireless network generally.

Device readable medium may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. Device readable medium may store any suitable instructions, data or information, including a computer program, software, an application including one or more of logic, rules, code, tables, etc. and/or other instructions capable of being executed by processing circuitry and, utilized by network node 110. Device readable medium may be used to store any calculations made by processing circuitry and/or any data received via interface. In some embodiments, processing circuitry and device readable medium may be considered to be integrated.

Interface is used in the wired or wireless communication of signaling and/or data between network node 110, network, and/or UEs. As illustrated, interface comprises port (s)/terminal(s) send and receive data, for example to and from network over a wired connection. Interface also includes radio front end circuitry that may be coupled to, or in certain embodiments a part of, antenna. Radio front end circuitry comprises filters and amplifiers. Radio front end circuitry may be connected to antenna and processing circuitry.

Radio front end circuitry may be configured to condition signals communicated between antenna and processing circuitry. Radio front end circuitry may receive digital data that is to be sent out to other network nodes or UEs via a wireless connection. Radio front end circuitry may convert the digital data into a radio signal having the appropriate channel and bandwidth parameters using a combination of filters and/or amplifiers. The radio signal may then be transmitted via antenna. Similarly, when receiving data, antenna may collect radio signals which are then converted into digital data by radio front end circuitry. The digital data may be passed to processing circuitry. In other embodiments, the interface may comprise different components and/or different combinations of components.

In certain alternative embodiments, network node 110 may not include separate radio front end circuitry, instead, processing circuitry may comprise radio front end circuitry and may be connected to antenna without separate radio front end circuitry. Similarly, in some embodiments, all or some of RF transceiver circuitry may be considered a part of interface. In still other embodiments, interface may include one or more ports or terminals, radio front end circuitry, and RF transceiver circuitry, as part of a radio unit, and interface may communicate with baseband processing circuitry, which is part of a digital.

Antenna may include one or more antennas, or antenna arrays, configured to send and/or receive wireless signals. Antenna may be coupled to radio front end circuitry and may be any type of antenna capable of transmitting and receiving data and/or signals wirelessly. In some embodiments, antenna may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna may be separate from network node 110 and may be connectable to network node 110 through an interface or port.

Antenna, interface, and/or processing circuitry may be configured to perform any receiving operations and/or certain obtaining operations described herein as being performed by a network node. Any information, data and/or signals may be received from a wireless device, another network node and/or any other network equipment. Similarly, antenna, interface, and/or processing circuitry may be configured to perform any transmitting operations described herein as being performed by a network node. Any information, data and/or signals may be transmitted to a wireless device, another network node and/or any other network equipment.

Power circuitry may comprise, or be coupled to, power management circuitry and is configured to supply the components of network node 110 with power for performing the functionality described herein. Power circuitry may receive power from power source. Power source and/or power circuitry may be configured to provide power to the various components of network node 110 in a form suitable for the respective components (e.g., at a voltage and current level needed for each respective component). Power source may either be included in, or external to, power circuitry and/or network node 110. For example, network node 110 may be connectable to an external power source (e.g., an electricity outlet) via an input circuitry or interface such as an electrical cable, whereby the external power source supplies power to power circuitry. As a further example, power source may comprise a source of power in the form of a battery or battery pack which is connected to, or integrated in, power circuitry. The battery may provide backup power should the external power source fail. Other types of power sources, such as photovoltaic devices, may also be used.

Alternative embodiments of network node 110 may include additional components that may be responsible for providing certain aspects of the network node's functionality, including any of the functionality described herein and/or any functionality necessary to support the subject matter described herein. For example, network node 110 may include user interface equipment to allow input of information into network node 110 and to allow output of information from network node 110. This may allow a user to perform diagnostic, maintenance, repair, and other administrative functions for network node 110.

As used herein, wireless device (WD) refers to a device capable, configured, arranged and/or operable to communicate wirelessly with network nodes and/or other wireless devices.

Unless otherwise noted, the term WD may be used interchangeably herein with user equipment (UE).

Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

Figure 4:
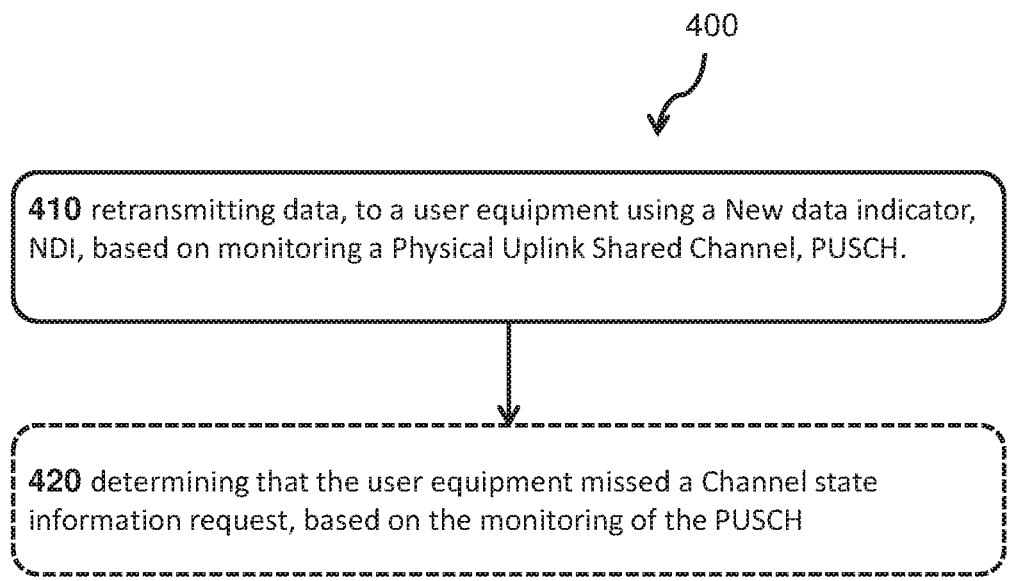
FIG. 4 shows a flowchart of a method according to one or more embodiments of the present disclosure.

FIG. 4 shows a flowchart of a method 400 according to one or more embodiments of the present disclosure. The method 400 is performed by a network node 110, and comprises:

Step 410: retransmitting data, to a user equipment, UE, using a New data indicator, NDI, based on monitoring a Physical Uplink Shared Channel, PUSCH.

In one example, the network node, e.g. a gNB, may monitor PUSCH and use NDI based on the monitoring of PUSCH. In other words, Monitoring PUSCH may be seen as a way to determine if the UE transmitted a scheduled PUSCH and/or that the UE has successfully received the CSI request and/or that the UE has successfully received an aperiodic CSI-RS indication/Channel state information, CSI, request. Examples of the gNB monitoring PUSCH may pertain to that a gNB determines if the UE transmitted a scheduled PUSCH by performing so called DTX detection of the PUSCH. Such a detection may simply be implemented as an energy detection, where the signal energy in the time-frequency resources allocated for the scheduled PUSCH transmission is compared against a threshold (where the threshold may be a function of estimated interference and noise power at the gNB). Another example of the gNB monitoring a PUSCH is that the gNB may try to estimate the channel estimation error on the DMRS associated by the PUSCH and determine that the PUSCH was not transmitted if the estimated channel estimation error exceeds a threshold. Yet another example of a gNB monitoring the PUSCH may be that the gNB tries to decode the PUSCH and may determine that the PUSCH was not transmitted in case a cyclic redundancy check, CRC, check fails for all code blocks, CBs, of a transport block, TB, of the PUSCH. Alternatively, it may determine that the PUSCH was not transmitted if one or more CBs CRC checks fails or if the CRC check for the TB fails.

The retransmitted data may be a transport block or parts of a transport block previously sent in an initial or preceding transmission.

Depending on the outcome of the monitoring by the gNB of the PUSCH, it may determined/concluded whether the aperiodic CSI-RS indication/Channel state information, CSI, request was missed or not by the UE. In other words, the method further comprises the step of determining that the user equipment (UE) missed a Channel state information (CSI) request, based on the monitoring of the PUSCH. Consequently the gNB may carry out different retransmission procedures, such as using NDI when retransmitting a transport block. E.g., if the aperiodic CSI-RS indication was received correctly by the UE, so that the PDSCH RE mapping assumed by the UE was the correct one, the retransmission may be carried in a regular fashion without any special action by the gNB. However, if the UE missed the aperiodic CSI-RS indication and mapped PDSCH incorrectly, not taking into account the aperiodic CSI-RS, it is beneficial to try to flush out (at least partially) the soft buffer of the UE so that the "trash bits" are flushed out.

In one embodiment, the gNB toggles the NDI bit in the DCI scheduling the retransmission if it is determined that the UE missed the aperiodic CSI-RS indication/CSI request, indicating that the retransmission is actually a new initial transmission of a new TB. In other words, using a New data indicator, NDI comprises transmitting downlink control information, DCI, associated to the retransmitted data, and toggling an NDI bit of the associated DCI to indicate that one or more soft buffers of the UE should be flushed.

By doing this, the UE will flush out its soft buffer comprising all the received soft bits from the initial transmission (i.e. both the OK bits and the "trash bits"), as these will not be helpful in trying to decode the TB. The retransmission will thus look as a new initial transmission to the UE and may for instance be transmitted using RV0. While, on the other hand, if the gNB determined that the UE received the aperiodic CSI-RS indication, it will transmit the retransmission in a regular fashion and thus not toggle the NDI bit and for instance transmit RV2 (although any RV may be transmitted).

In one embodiment, using a New data indicator, NDI comprises transmitting downlink control information, DCI, associated to the retransmitted data, and toggling an NDI bit of the associated DCI to indicate that one or more soft buffers of the UE should be flushed.

Figure 5:
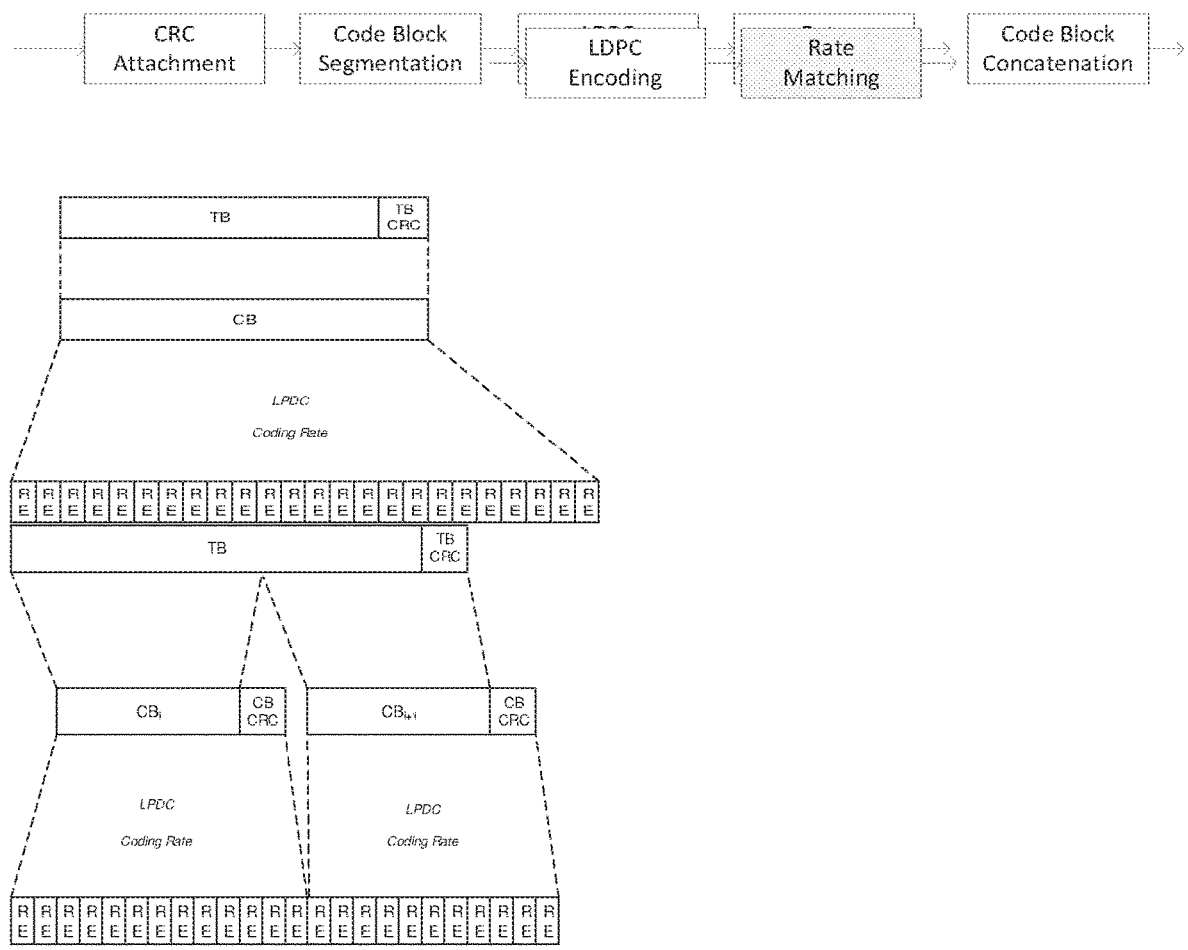
FIG. 5 illustrates a channel coding scheme according to one or more embodiments of the present disclosure.

As further described in relation to FIG. 5, if the transport block, TB, size is larger than a threshold, it is segmented into multiple code blocks (CBs). This may be referred to as using CBG based transmission.

In another embodiment using CBG based transmission, the gNB retransmits all CBGs and sets the CBGFI indicator bit to indicate that the soft buffer corresponding to all CBGs should be flushed.

In one embodiment, the DCI associated to the retransmitted data further indicates that Code Block Group, CBG, based transmission is used and that a CBGFI indicator is set to indicate that soft buffers of the UE, corresponding to all CBGs, should be flushed.

In another embodiment using CBG based transmission, the gNB retransmits only the CBGs that the UE couldn't decode (as indicated by HARQ feedback) and sets the CBGFI indicator bit to indicate that the soft buffer corresponding to the retransmitted CBGs should be flushed.

In one example, it is known to the network node that no aperiodic CSI-RS were transmitted during a first number P of CBGs and that aperiodic CSI-RS were transmitted in at least in some of the following Q CBGs. The first number P of CBGs can then be kept in the buffer, and the following Q CBGs can be selected and flushed.

In one embodiment, the DCI associated to the retransmitted data further indicates that Code Block Group, CBG, based transmission is used and that a CBGFI indicator is set to indicate that soft buffers of the UE, corresponding to a selection of CBGs, should be flushed.

The TB may comprise multiple CBs and as the modulation symbols of different CBs are mapped sequentially onto PDSCH REs (which then follow the layer first, then subcarrier, then OFDM symbol mapping) it may be so that, if the aperiodic CSI-RS occurs later in the slot, a number of the initial CBs could be "uncontaminated" by the CSI-RS.

However, a further problem is that as the determination of how many coded bits in the PDSCH are assigned to each CB, depends on dividing the number of total coded bits by the number of CBs, even the initial CBs will be incorrect as the number of coded bits per CB will be wrongly determined by the UE and hence the bit positions will be shifted incorrectly. To remedy this problem, in an embodiment, the gNB signals an indication of the total number of coded bits in the TB. As the number of coded bits may be larger and thus require many bits to signal.

In some embodiments, the number of REs available for PDSCH in the initial transmission is signaled wherefrom the UE may derive the number of coded bits in the initial transmission. Based on this, the UE may reorder its soft buffer so that the first CBs (before the first CSI-RS bits) may be assigned the correct coded bits. The gNB may then couple this with CBG based retransmission and indicate that the later CBGs (corresponding to CBs affected by the CSI-RS bits) are flushed (by setting the CBGFI bit to 1) and only retransmit those CBGs.

In one embodiment, the method further comprises signaling an indication of a total number of coded bits of the data.

In another variant of the embodiment, the gNB may signal the number of REs in the initial transmission that where not for PDSCH (i.e. the number of REs rate matched around). In further variants, the gNB may signal the number of additional REs that were dynamically indicated for rate matching around (i.e. the number of aperiodic CSI-RS REs). The motivation is that that number of REs is smaller and so would require less number of bits to signal. The signaling in these embodiments may be conveyed by a number of DCI fields which may not be used for the retransmission.

In one embodiment, the method further comprises signaling an indication of a number of resource elements, REs, in an initial data transmission, that where not allocated for PDSCH transmission. In other words, the number of Res, or secondary set of resources, allocated to transmitting aperiodic CSI-RS.

It can be realized that, if the gNB could signal the exact location of the missed aperiodic CSI-RS, the UE could completely re-align its soft buffer so that all bits in all code blocks end up in the right place (and it may even correctly decode the reordered initial transmission without the need of a retransmission). Therefore, in one embodiment, a number of DCI fields are reinterpreted so that they indicate which aperiodic CSI-RS (if any) was present in the initial transmission. This may for instance be done by signaling the content of the CSI request field (which can be up to 6 bits) of the initial transmission in some unused fields of the DCI of the retransmission. For instance, the CBGTI field can be reinterpreted in this fashion if a certain combination of other DCI fields is set in a certain way. Thus, upon receiving this retransmission DCI, the UE knows that the initial transmission was rate matched by the indicated aperiodic CSI-RS/DCI request and can reorder its soft buffer accordingly.

In one embodiment, the method 400 further comprises

Step 420: determining that the user equipment, UE, missed a Channel state information, CSI, request, based on the monitoring of the PUSCH.

Transmitting on configured or allocated resources and/or utilizing configured allocated resources (e.g., by a network node or UE) may comprise transmitting data on these resources, e.g. on the frequency and/or subcarrier and/or carrier and/or timeslots or subframes of the resources.

In one embodiment, DCI used for uplink transmissions comprises a selection of any of Frequency domain resource assignment, Time domain resource assignment, Modulation and coding scheme—5 bits, New data indicator—1 bit, Redundancy version—2 bits, HARQ process number—4 bits, TPC command for scheduled PUSCH—2 bits, CSI request—0, 1, 2, 3, 4, 5, or 6 bits determined by higher layer parameter ReportTriggerSize.

In one embodiment, DCI used for DL transmissions for PDSCH comprises a selection of any of Frequency domain resource assignment, Time domain resource assignment, Modulation and coding scheme—5 bits, New data indicator—1 bit, Redundancy version—2 bits, HARQ process number—4 bits, ZP CSI-RS trigger—X bits, CBG transmission information (CBGTI)—0, 2, 4, 6, or 8 bits as defined in Subclause x.x of [6, TS38.214 3GPP], determined by higher layer parameter maxCodeBlockGroupsPerTransportBlock for the PDSCH, CBG flushing out information (CBGFI)—0 or 1 bit as defined in Subclause x.x of [6, TS38.214 3GPP], determined by higher layer parameter codeBlockGroupFlushIndicator.

There are certain combinations of bit fields in the DCI that are not likely to be used. For example, toggling the NDI while transmitting RV 1 or 2 is unlikely to be used by a scheduler since RV 1 or 2 are not self-decodable unless the rate is low. Another bit field combination unlikely to be used is to set all bits of the code block group transmission indicator (CBGTI) field to zero, indicating that no code block groups are transmitted. The inventors have made the realization that some of these bit fields in the DCI may be used to indicate that part of or all of the buffer should be flushed.

As previously mentioned, Channel state information (CSI) feedback is used by the gNB to obtain DL CSI from a UE, e.g. in order to determine how to transmit DL data to a UE over plurality of antenna ports. CSI typically includes a channel rank indicator (RI), a precoding matrix indicator (PMI) and a channel quality indicator (CQI). RI is used to indicate the number of data layers that can be transmitted simultaneously to a UE, PMI is used to indicate the precoding matrix over the indicated data layers, and CQI is used to indicate the modulation and coding rate can be achieved by with the indicated rank and the precoding matrix.

In NR, in addition to periodic and aperiodic CSI reporting as in LTE, semi-persistent CSI reporting is also supported. Thus, three types of CSI reporting will be supported in NR as follows:

Periodic CSI (P-CSI) Reporting on PUCCH: CSI is reported periodically by a UE. Parameters such as periodicity and slot offset are configured semi-statically by higher layer RRC signaling from the gNB to the UE Aperiodic CSI (A-CSI) Reporting on PUSCH: This type of CSI reporting involves a single-shot (i.e., one time) CSI report by a UE which is dynamically triggered by the gNB using DCI.

Some of the parameters related to the configuration of the aperiodic CSI report are semi-statically configured by RRC but the triggering is dynamic Semi-Persistent CSI (SP-CSI) Reporting on PUSCH: similar to periodic CSI reporting, semi-persistent CSI reporting has a periodicity and slot offset which may be semi-statically configured. However, a dynamic trigger from gNB to UE may be needed to allow the UE to begin semi-persistent CSI reporting. A dynamic trigger from gNB to UE is needed to request the UE to stop the semi-persistent CSI reporting Non-zero power (NZP) CSI-RS is typically used for measuring downlink CSI by a UE. CSI-RS is transmitted over each transmit, Tx, antenna port at the gNB and for different antenna ports, the CSI-RS are multiplexed in time, frequency and code domain such that the channel between each Tx antenna port at the gNB and each receive antenna port at a UE can be measured by the UE. A time frequency resource used for transmitting CSI-RS is referred to as a CSI-RS resource. The PDSCH is not mapped to resource elements containing CSI-RS, which colloquially is referred to as "PDSCH rate matches around CSI-RS".

In NR, the following three types of CSI-RS transmissions are supported:

Periodic CSI-RS (P CSI-RS): CSI-RS is transmitted periodically in certain slots. This CSI-RS transmission is semi-statically configured using parameters such as CSI-RS resource, periodicity and slot offset.

Aperiodic CSI-RS (AP CSI-RS): This is a one-shot CSI-RS transmission that can happen in any slot. Here, one-shot means that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through PDCCH using the CSI request field in UL DCI. Multiple aperiodic CSI-RS resources can be included in a CSI-RS resource set and the triggering of aperiodic CSI-RS is on a resource set basis.

Semi-Persistent CSI-RS (SP CSI-RS): Similar to periodic CSI-RS, resources for semi-persistent CSI-RS transmissions are semi-statically configured with parameters such as periodicity and slot offset. However, unlike periodic CSI-RS, dynamic signaling is needed to activate and deactivate the CSI-RS transmission.

In the case of aperiodic CSI-RS and/or aperiodic CSI reporting, the gNB RRC configures the UE with $S_c$ CSI triggering states. Each triggering state contains the aperiodic CSI report setting to be triggered along with the associated aperiodic CSI-RS resource sets.

FIG. 5 illustrates a channel coding scheme according to one or more embodiments of the present disclosure. Transmitting or retransmitting data may comprise the step of channel coding as described below. In one example Code Block Group, CBG, based transmission is used. The channel coding scheme for PDSCH in NR is based on LDPC codes. A transport block (TB), containing information bits to be transmitted, undergoes the following encoding scheme. First, a cyclic redundancy check CRC sequence is attached to the transport block TB for error detection purpose. If the TB size is larger than a threshold, it is segmented into multiple code blocks (CBs), otherwise the TB is mapped to a single CB. If segmented into multiple CBs, a CRC is attached to each CB to enable error detection on a per-CB level. Multiple CBs can be grouped together to form a Code Block Group (CBG), and if CBG-based retransmission is configured, the UE may transmit ACK/NACK separately for each CBG such that only incorrectly decoded CBGs needs to be retransmitted instead of the entire TB. Each CB undergoes a separate LDPC encoding procedure, mapping the information bits in the CB to coded output bits. The coded output bits per CB are then placed in a circular buffer, where a bit level interleaver is also applied. In the next step of the procedure, rate matching is applied to read out the desired number of coded bits from the circular buffer per CB, so as to fit the resource allocation of the PDSCH. Bits are read out of the buffer starting at a certain starting point, indicated by the redundancy version, RV. Four different RVs (0, 1, 2, 3) are defined, corresponding to different starting positions in the circular buffer. The intention is that different RVs can be transmitted in initial transmissions and retransmissions, realizing the incremental redundancy (IR) HARQ scheme. After rate matching per CB, the rate matched output bits from the CBs are concatenated and finally mapped to REs allocated for the PDSCH.

Figure 6:
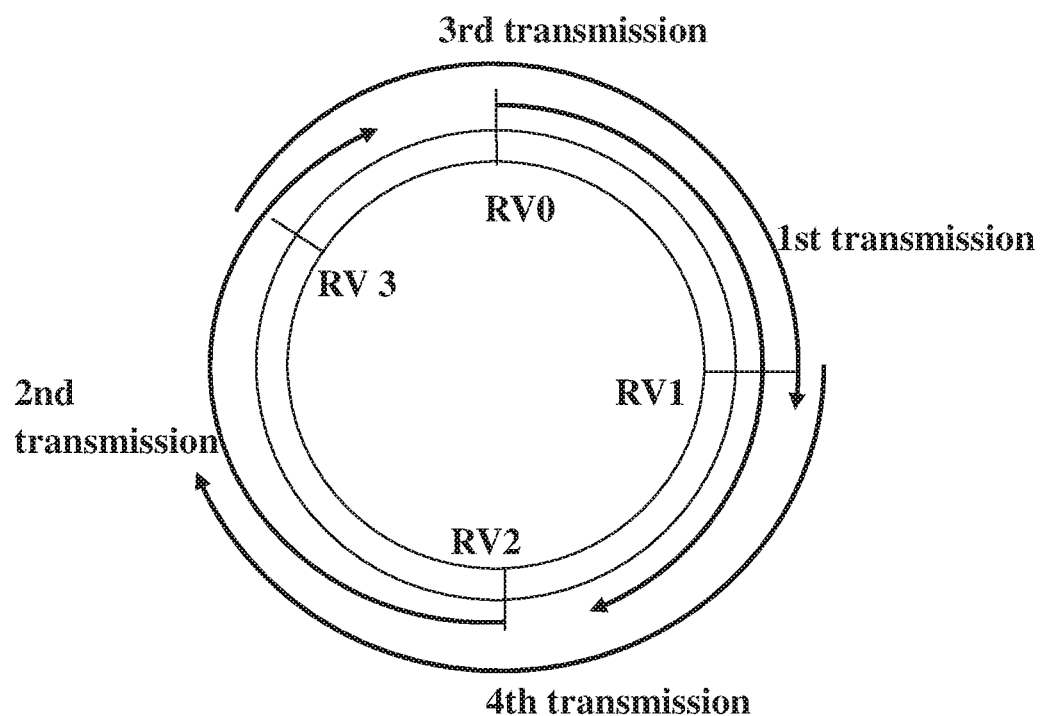
FIG. 6 illustrates a circular buffer with different RV starting points according to one or more embodiments of the present disclosure.

FIG. 6 illustrates a circular buffer with different Redundancy Version, RV, starting points according to one or more embodiments of the present disclosure. As can be seen from FIG. 6, different transmissions may use different RVs.

Further in the example, when the UE received a DCI scheduling PDSCH transmission, it is indicated with the PDSCH resource allocation, MCS, NDI and RV for each codeword (CW), up to two CWs may be transmitted in a PDSCH in NR. As 2 CWs are only used for rank 5 transmission and higher, typically only one CW is used. Each CW is mapped to a TB. The Modulation Coding Scheme, MCS, indicates the modulation scheme and target code rate for the TB. Based on the target code rate and the PDSCH allocation, the UE derives the TB size (TBS) based on a formula by calculating the number of available REs for PDSCH assuming a fixed default overhead (thus the TBS determination does not depend on the actual RE overhead in the scheduled slot). The UE may then map the received modulation symbols to soft estimates of the coded bits, and stores it in a soft buffer. It then feeds the soft estimates of the coded bits to the LDPC decoder and tries to decode the CB. If all CBs are correctly decoded (or all CBs within the CBG if CBG-based retransmission is used), the TB (or CBG) is correctly decoded and the UE transmits uplink information, such as a HARQ-ACK, on PUCCH. Otherwise, the UE feeds back a HARQ-NACK and the gNB initiates a retransmission of the CB. The UE will maintain its soft buffer until the gNB schedules a new TB, which is indicated by toggling of the NDI bit in the DCI, whereupon the UE flushes its soft buffer and instead stores the soft channel bits corresponding to the new TB. However, in the case of retransmission (NDI not toggled), the UE maintains its soft buffer as said so that it may combine its previously received transmission with the retransmission for increased decoding success probability.

Typically in a retransmission, the gNB will transmit using another or different RV. E.g. RV0 is transmitted in the initial transmission while RV2 is transmitted in the first retransmission. The UE's soft buffer typically contains room for the entire cyclic buffer (however, in case that the UE supports multiple CCs, the soft buffer size may be constrained so that in some cases it is smaller than the circular buffer size, whereby Chase combining may have to be used instead of IR). The UE will add the estimated soft channel bits corresponding to the retransmission in the correct place in the soft buffer (i.e. starting at the RV position). In case an estimate of some bits is already available from a previous transmission, the soft estimates of the bits are combined.

As indicated previously in relation to FIG. 3, the presence of aperiodic CSI-RS is indicated with an UL DCI, effectively scheduling a PUSCH transmission. If the UE misses the UL DCI, the UE is then unaware of the presence of aperiodic CSI-RS and hence if the UE also receives a PDSCH in the same slot as where aperiodic CSI-RS is triggered, the UE will not be aware of the correct resource mapping of the PDSCH and the PDSCH will be incorrectly decoded.

This present disclosure therefore provides a method to improve robustness in retransmission of data, for the case where the UE misses an UL DCI triggering an aperiodic CSI-RS in the same slot where the UE is also scheduled with PDSCH transmission.

Figure 7:
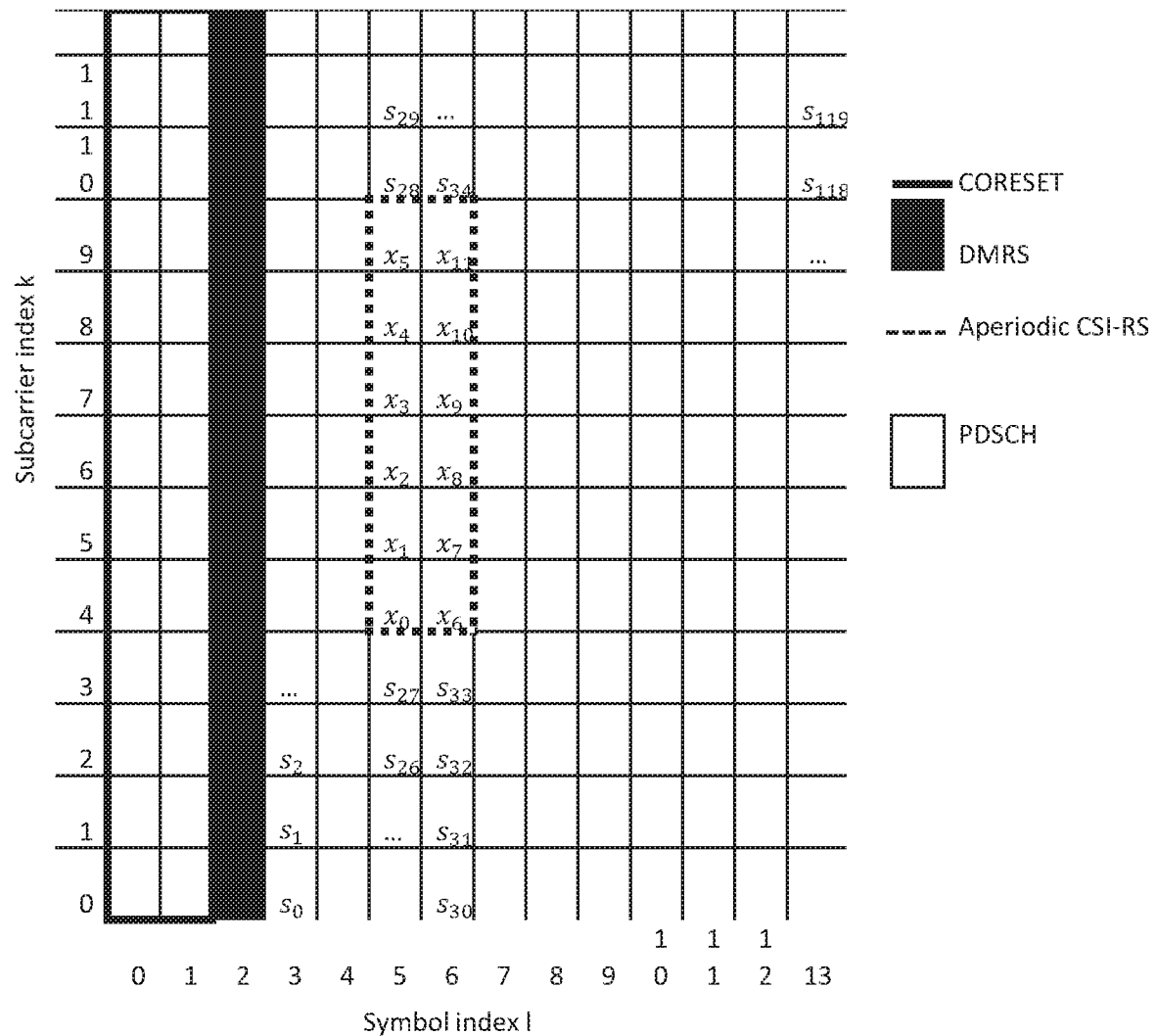
FIG. 7-8 illustrates a problem when retransmitting data according to one or more embodiments of the present disclosure.

FIG. 7 illustrates a problem when retransmitting data according to one or more embodiments of the present disclosure. A PDSCH transmission is scheduled by a DL DCI, e.g. using format 1_0 or 1_1 in NR, which indicates, in addition to other things, the frequency-domain PRBs and the time-domain OFDM symbols whereon the PDSCH is to be carried. The information symbols of the PDSCH is mapped to the physical resources indicated for the PDSCH transmission first across layers, then subcarriers and finally OFDM symbols $S_0$-$S_{119}$. However, PDSCH modulation symbols are not mapped to resource elements occupied by other physical signals that the UE has been configured with (colloquially expressed as that the PDSCH is "rate matched around" said physical signals). Such physical signals comprise for instance NZP CSI-RS and ZP CSI-RS, which can have different time-domain behavior, such as periodic, semi-persistent and aperiodic. For periodic and semi-persistent CSI-RS, which are semi-statically configured/activated, there is no risk for misunderstanding between the UE and gNB regarding if the CSI-RS is present or not. However, for aperiodic CSI-RS, which's presence in a slot is dynamically indicated in the DCI (in a one-shot fashion). There is a risk for misunderstanding if the UE misses the DCI which triggers the aperiodic CSI-RS.

Figure 8:
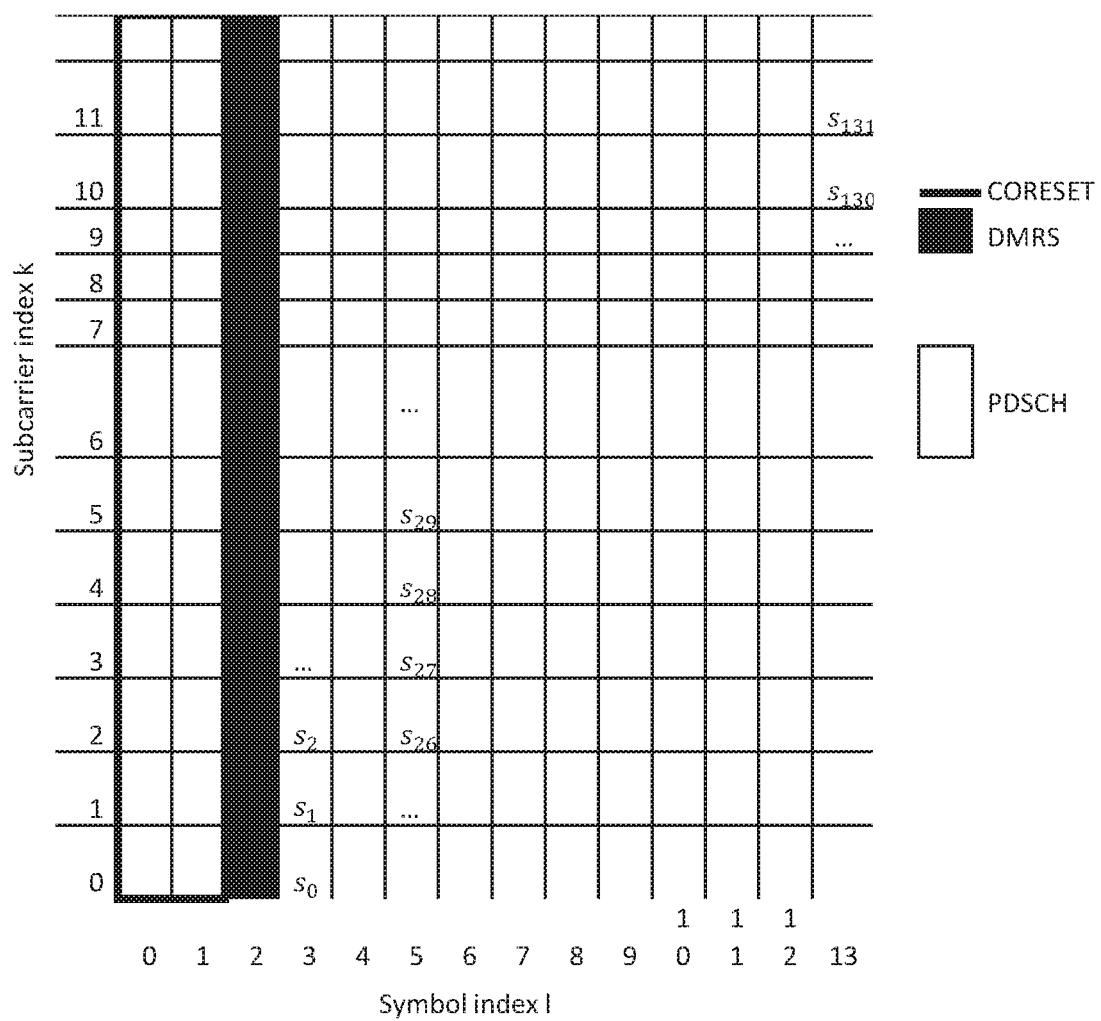

For aperiodic ZP CSI-RS, this is not an issue, since it is triggered with the same DCI which also schedules the PDSCH, so if that DCI is missed the PDSCH transmission is anyway lost. However, aperiodic NZP CSI-RS is triggered with a separate UL DCI (scheduling PUSCH), meaning that there is a possibility that the UE correctly received the DL DCI scheduling the PDSCH but misses the UL DCI triggering the aperiodic NZP CSI-RS. Then, there will be a misunderstanding of the presence of the aperiodic CSI-RS between the UE and gNB. This is illustrated in FIGS. 7-8. FIG. 7 illustrates an example resource mapping of the PDSCH, which maps the 120 PDSCH modulation symbols $s_j$ or $S_0$-$S_{119}$ around the REs occupied by the aperiodic CSI-RS.

FIG. 8 illustrates an example of an UEs view of allocated resources when the US misses the DCI which triggers the aperiodic CSI-RS. The UE is then not aware of the aperiodic CSI-RS transmission, it will interpret the transmission wrongly and think that the whole later part of the slot is actually filled up with data comprised in 132 PDSCH modulation symbols. That is, the CSI-RS symbols $X_1$-$X_{11}$ are incorrectly interpreted as PDSCH symbols. Not only will this cause the LDPC decoder to estimate the information bits from the CSI-RS bits, but it will shift the positions of the following PDSCH bits in the soft buffer so that they end up in an incorrect position, meaning that any bits following the first incorrect CSI-RS bits will not be useful for decoding the PDSCH. In fact, they will be directly harmful since they will contain the wrong information.

Figure 9:
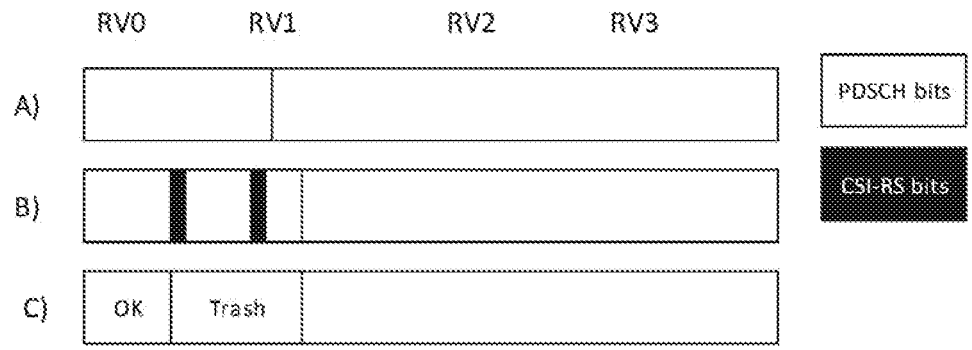
FIG. 9 illustrates the content of a buffer in different scenarios.

FIG. 9 illustrates the content of a buffer in different scenarios. Note that a bit interleaver is also applied on the bits in a code block, which is not illustrated in FIG. 9. This means that the first "CSI-RS bits" will likely occur early in the soft buffer even if the CSI-RS occurs late in the slot (since the bits are spread out). Thus, likely most of the bits in the soft buffer will be "trash bits". As can be seen in FIG. 9 the expected state of a soft buffer A) if the aperiodic CSI-RS indication/CSI request was correctly received by the UE is illustrated. Further, FIG. 9 illustrates a soft buffer B) if the UE missed aperiodic CSI-RS indication/CSI request, including CSI-RS symbols incorrectly interpreted as PDSCH bits. Further, FIG. 9 illustrates C) "Trash" bits in the soft buffer, which will only reduce PDSCH decoding probability.

In other words, the present disclosure provides a method, performed at a network node 110, for performing a retransmission of data, e.g. comprised in a transport block. The method may comprise transmitting an initial transmission of the transport block on a downlink physical channel, such as the PDSCH. A downlink control information, DCI, is transmitted which both triggers a physical signal and schedules an uplink physical channel for a UE/wireless device, such that the physical signal is triggered in the same slot as the downlink physical channel. The method may further comprise determining if the downlink control information was correctly received by the wireless device/UE. The method may then comprises transmitting the retransmission of the transport block according to a first procedure if the downlink control information was correctly received by the wireless device and a second procedure if the downlink control information was incorrectly received by the wireless device. Determining if the downlink control information was correctly received by the wireless device may comprise determining if the uplink physical channel PUSCH was transmitted by the UE/wireless device. This may involve, performing DTX detection or checking whether a CRC matches. The physical signal may comprise an aperiodic NZP CSI-RS. The second procedure may comprise toggling the NDI bit and the first procedure comprises not toggling the NDI bit. The second procedure may comprise giving a pre-emption indication and the first procedure may comprise not giving a pre-emption indication. The second procedure may comprise setting a code block group flush indication (CBGFI) bit to 1 and the first procedure comprises setting a CBGFI bit to 0. The second procedure may comprises using an unlikely combination of bit fields (some combination of toggling NDI together with RV 1 or 2, or setting all CBGTI bits to 0) to indicate that one of a set of specific NZP CSI-RS configurations was transmitted in the initial transmission.

This has the advantage to allow the UE to reorder its soft buffer in the first transmission, thereby gaining from incremental redundancy in the retransmission. If all CBGTI bits are set to 0 a default set of CBGs are assumed to be transmitted in the retransmission, for example all CBGs.

Finally, it should be understood that the invention is not limited to the embodiments described above, but also relates to and incorporates all embodiments within the scope of the appended independent claims.

The invention claimed is:

1. A method performed by a network node, the method comprising:
retransmitting data, to a user equipment, UE, using a New data indicator, NDI, based on monitoring a Physical Uplink Shared Channel, PUSCH; and
determining that the UE missed a Channel state information, CSI, request, based on the monitoring of the PUSCH.

2. The method according to claim 1, wherein using a New data indicator, NDI, comprises transmitting downlink control information, DCI, associated to the retransmitted data, and toggling an NDI bit of the associated DCI to indicate that one or more soft buffers of the UE should be flushed.

3. The method according to claim 2, wherein the DCI associated to the retransmitted data further indicates that Code Block Group, CBG, based transmission is used and that a CBGFI indicator is set to indicate that soft buffers of the UE, corresponding to all CBGs, should be flushed.

4. The method according to claim 2, wherein the DCI associated to the retransmitted data further indicates that Code Block Group, CBG, based transmission is used and that a CBGFI indicator is set to indicate that soft buffers of the UE, corresponding to a selection of CBGs, should be flushed.

5. The method according to claim 3, further comprising one of:
   signaling an indication of a total number of coded bits of the data; and
   signaling an indication of a number of resource elements, REs, in an initial data transmission, that where not allocated for PDSCH transmission.

6. A network node comprising processing circuitry configured to:
   retransmit data, to a user equipment, UE, using a New data indicator, NDI, based on monitoring a Physical Uplink Shared Channel, PUSCH; and
   determine that the UE missed a Channel state information, CSI, request, based on the monitoring of the PUSCH.

7. The network node according to claim 6, wherein the processing circuitry is configured to use a New data indicator, NDI, by transmitting downlink control information, DCI, associated to the retransmitted data, and toggle an NDI bit of the associated DCI to indicate that one or more soft buffers of the UE should be flushed.

8. The network node according to claim 6, wherein the DCI associated to the retransmitted data further is configured to indicate that Code Block Group, CBG, based transmission is used and that a CBGFI indicator is configured to be set to indicate that soft buffers of the UE, corresponding to all CBGs, should be flushed.

9. The network node according to claim 6, wherein the DCI associated to the retransmitted data further is configured to indicate that Code Block Group, CBG, based transmission is used and that a CBGFI indicator is configured to be set to indicate that soft buffers of the UE, corresponding to a selection of CBGs, should be flushed.

10. The network node according to claim 6, wherein the processing circuitry is further configured to one of:
    signal an indication of a total number of coded bits of the data; and
    signal an indication of a number of resource elements, REs, in an initial data transmission, that where not allocated for PDSCH transmission.

* * * * *